(12) United States Patent
Saurabh et al.

(10) Patent No.: US 11,367,083 B1
(45) Date of Patent: Jun. 21, 2022

(54) METHOD AND SYSTEM FOR EVALUATING CONTENT FOR DIGITAL DISPLAYS BY MEASURING VIEWER RESPONSES BY DEMOGRAPHIC SEGMENTS

(75) Inventors: Varij Saurabh, State College, PA (US); Rajeev Sharma, State College, PA (US); Namsoon Jung, State College, PA (US)

(73) Assignee: VideoMining Corporation, State College, PA (US)

( * ) Notice: Subject to any disclaimer, the term of this patent is extended or adjusted under 35 U.S.C. 154(b) by 1155 days.

(21) Appl. No.: 12/313,459

(22) Filed: Nov. 20, 2008

(51) Int. Cl.
*G06Q 30/02* (2012.01)

(52) U.S. Cl.
CPC .................................. *G06Q 30/02* (2013.01)

(58) Field of Classification Search
CPC ...................................................... G06Q 30/02
USPC ......... 705/14.41, 14.44, 14.45, 14.57, 14.66, 705/14.68
See application file for complete search history.

(56) References Cited

U.S. PATENT DOCUMENTS

| | | | |
|---|---|---|---|
| 5,227,874 A | 7/1993 | Von Kohorn | |
| 5,991,734 A | 11/1999 | Moulson | |
| 6,045,226 A | 4/2000 | Claessens | |
| 6,228,038 B1 | 5/2001 | Claessens | |
| 6,286,005 B1 | 9/2001 | Cannon | |
| 6,443,840 B2 | 9/2002 | Von Kohorn | |
| 6,516,464 B1 | 2/2003 | Claessens | |
| 7,116,716 B2 | 10/2006 | Ma et al. | |
| 7,151,540 B2 | 12/2006 | Young | |
| 7,302,475 B2 | 11/2007 | Gold et al. | |
| 7,374,096 B2 | 5/2008 | Overhultz et al. | |
| 7,643,658 B2* | 1/2010 | Kilner et al. | 382/118 |
| 2003/0032890 A1* | 2/2003 | Hazlett | A61B 5/0488 600/546 |
| 2009/0012847 A1* | 1/2009 | Brooks et al. | 705/10 |
| 2009/0030780 A1* | 1/2009 | York et al. | 705/10 |
| 2009/0043504 A1* | 2/2009 | Bandyopadhyay et al. | 701/213 |
| 2009/0087099 A1* | 4/2009 | Nakamura | G06K 9/00281 382/190 |
| 2010/0169173 A1* | 7/2010 | Vogels | 705/14.41 |
| 2014/0188836 A1* | 7/2014 | Lunenfeld | 707/707 |

OTHER PUBLICATIONS

Harrison, An emerging marketplace for digital advertising based on amalgamated digital signage networks, 2003, IEEE.*
U.S. Appl. No. 11/805,321, Sharma, et al.
U.S. Appl. No. 11/999,649, Jung, et al.

(Continued)

*Primary Examiner* — Arthur Duran

(57) ABSTRACT

The present invention is a method and system for evaluating relative effectiveness of content in a digital signage network, using a series of measurements to compare and evaluate different contents. The measurements are performed on a plurality of input images of the people captured by a plurality of means for capturing images in the vicinity of at least a digital signage. The present invention is a content rating system based on how the audience responds to the digital content in the intended context of digital media network in-store or in other public viewing areas. The present invention allows the measurement of the response to the content for different segments, further allowing for better planning of the content and optimizing the advertising dollars.

6 Claims, 12 Drawing Sheets

(56) References Cited

OTHER PUBLICATIONS

U.S. Appl. No. 12/215,877, Sharma, et al.
Cohn, J. F., et al., "Automated face analysis by feature point tracking has high concurrent validity with manual FACS coding," Psychophysiology, pp. 35-43, 1999.
Essa, I. A., et al., "Facial expression recognition using a dynamic model and motion energy," presented at International Conference on Computer Vision, Jun. 1995.
Yacoob, Y., et al., "Recognizing human facial expression," University of Maryland, Technical Report CS-TR-3265, May 1994.

\* cited by examiner

TRAFFIC DATA
674

| traffic id | start time | end time | Dwell time | impression |
|---|---|---|---|---|
| 853669 | 6/2/08 12:11:32 AM | 6/2/08 12:14:55 AM | 0:03 | 1 |
| 468910 | 6/3/08 1:00:21 AM | 6/3/08 1:06:48 AM | 0:06 | 0 |
| 233444 | 6/4/08 1:49:10 AM | 6/4/08 1:57:32 AM | 0:08 | 1 |
| 503471 | 6/5/08 2:37:59 AM | 6/5/08 2:40:28 AM | 0:02 | 1 |
| 694674 | 6/6/08 3:26:48 AM | 6/6/08 3:31:30 AM | 0:04 | 1 |
| 47151 | 6/7/08 4:15:37 AM | 6/7/08 4:29:08 AM | 0:13 | 1 |
| 689058 | 6/8/08 5:04:26 AM | 6/8/08 5:08:21 AM | 0:03 | 1 |
| 100741 | 6/9/08 5:53:15 AM | 6/9/08 5:59:00 AM | 0:05 | 1 |
| 654701 | 6/10/08 6:42:04 AM | 6/10/08 6:54:05 AM | 0:12 | 1 |

IMPRESSION DATA
676

| impression id | start time | end time | impression length | gender | age | ethnicity |
|---|---|---|---|---|---|---|
| 231012 | 6/4/08 1:26:09 AM | 6/4/08 1:32:39 AM | 0:06 | M | AD | CN |
| 721889 | 6/6/08 11:14:13 AM | 6/6/08 11:19:18 AM | 0:05 | F | YA | AA |
| 538639 | 6/9/08 6:14:51 PM | 6/9/08 6:16:04 PM | 0:01 | M | AD | AN |
| 996325 | 6/8/08 10:44:04 PM | 6/8/08 10:47:20 PM | 0:03 | M | SR | AN |
| 410899 | 6/6/08 11:35:06 PM | 6/6/08 11:37:45 PM | 0:02 | M | SR | AA |
| 33810 | 6/10/08 5:25:20 AM | 6/10/08 5:26:32 AM | 0:01 | F | SR | HP |
| 69363 | 6/15/08 4:32:41 PM | 6/15/08 4:33:00 PM | 0:00 | M | AD | HP |
| 699537 | 6/9/08 7:13:34 AM | 6/9/08 7:15:37 AM | 0:02 | M | CD | CN |
| 328666 | 6/12/08 12:37:05 PM | 6/12/08 12:38:46 PM | 0:01 | F | YA | AN |

AUDIENCE AVAILABLE TO NODE
640

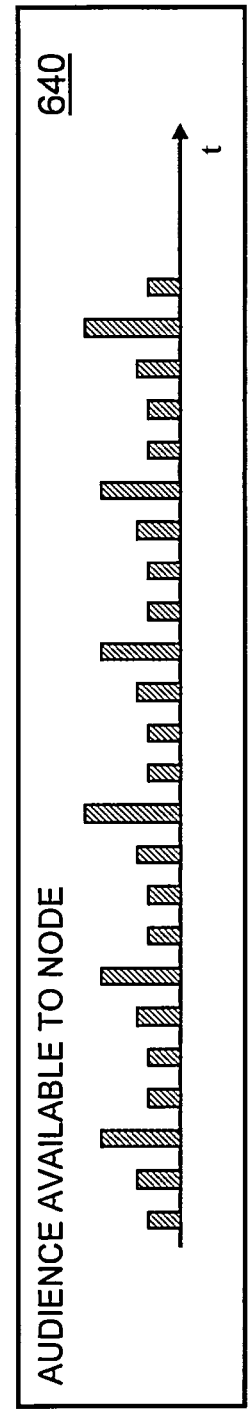

Fig. 2

MEDIA PLAY LOG 663

| Start time | end time | Content |
|---|---|---|
| 9/4/07 15:18:37 | 9/4/07 15:18:38 | name=Sign1&filename=spec_black.png |
| 9/4/07 15:18:38 | 9/4/07 15:18:44 | name=Sign1&filename=int_footage_00_off_NA.wr |
| 9/4/07 15:18:44 | 9/4/07 15:18:45 | name=Sign1&filename=spec_black.png |
| 9/4/07 15:18:45 | 9/4/07 15:19:07 | name=Sign1&filename=auto_livecamerac_NA.swf |
| 9/4/07 15:19:07 | 9/4/07 15:19:08 | name=Sign1&filename=spec_black.png |
| 9/4/07 15:19:08 | 9/4/07 15:19:15 | name=Sign1&filename=auto_shredder_00_off_NA |
| 9/4/07 15:19:15 | 9/4/07 15:19:16 | name=Sign1&filename=spec_black.png |
| 9/4/07 15:19:16 | 9/4/07 15:19:20 | name=Sign1&filename=int_strobe10_NA.swf |
| 9/4/07 15:19:20 | 9/4/07 15:19:21 | name=Sign1&filename=spec_black.png |
| 9/4/07 15:19:21 | 9/4/07 15:19:27 | name=Sign1&filename=int_chaching_00_off_NA.v |
| 9/4/07 15:19:27 | 9/4/07 15:19:28 | name=Sign1&filename=spec_black.png |

PLAY LOG OF TESTED CONTENT 641

Fig. 3

METHOD AND SYSTEM FOR EVALUATING CONTENT FOR DIGITAL DISPLAYS BY MEASURING VIEWER RESPONSES BY DEMOGRAPHIC SEGMENTS

BACKGROUND OF THE INVENTION

Field of the Invention

The present invention is a method and apparatus for evaluating relative effectiveness of contents in a digital signage by extracting characteristic information from the audience measurement data and a synchronized media play log of the contents for the digital signage.

Background of the Invention

There have been prior attempts for measuring marketing campaigns.

U.S. Pat. No. 6,286,005 of Cannon (hereinafter Cannon) disclosed computer-based systems for analyzing audience data. Cannon discloses a method and apparatus for quickly and easily retrieving, manipulating, and analyzing large quantities of computer-based data relevant to television-viewing consumers. The key differences between the systems disclosed by Cannon and the one in the current invention are that 1) Cannon primarily focused on a television audience, 2) the process used for data collection is different, 3) measurement provided by two systems are different.

First, the definition of audience is very different from television and digital signage. For television measurement, audience is defined as a household which had the television turned on when content was played, whereas, for digital signage, audience is defined as the group of persons present in the vicinity of the signage when the content was played. The definition of audience creates unique challenges in data collection and analysis; it also changes the types of analysis advertisers need. Cannon does not cover the challenges offered by digital signage.

Secondly, the system described by Cannon processes data primarily collected through exit interviews, telephone interviews, online surveys, etc., which require active participation from the audience members, whereas, the current invention uses automated video-based data collection to acquire the data. The types of data collected are very different. For example, Cannon discusses that the demographic information can include information such as a viewer's age, geographical location, income, and level of education, which cannot be calculated using computer vision algorithms. Therefore, the definition of the demographic information in Cannon is different from that of the current invention. Applicant's demographic information is primarily concerned with the audience in the vicinity of a digital signage, whereas the demographic information in Cannon is primarily concerned with the television-viewing consumers, so the approaches as to how the demographic information is gathered and applied in the embodiments are significantly different between Cannon and the current invention.

Thirdly, the current invention provides unique measurements not offered by Cannon. The current invention includes analyses of the actual time audience members spend watching the screen, the emotional impact of the content on the audience, and demographic segmentation based on automated estimation of age, gender, ethnicity, and shopping behavior. None of these parameters are measured or analyzed by the system proposed by Cannon.

U.S. Pat. No. 7,151,540 of Young (hereinafter Young) disclosed a system for audience attention and response evaluation. The patent describes a process of showing a given video content to a panel of people and then asking them to identify particular images from the content. The higher the number of people who identify a given image, the higher rating that image gets. The system disclosed will automatically tabulate and analyze the data collected. The key difference between Young's system and the current invention is that the current invention uses non-obtrusive, automated software and processes to collect the audience data. Also, the disclosed system first ranks the images in the content, and then tries to estimate the point in time at which most viewers stopped engaging the content. The current invention actually measures the point in time when the viewers start and stop looking at the content. The current system is superior because it directly measures the viewer behavior, is more accurate, and does not require active participation from viewers.

U.S. Pat. Nos. 6,516,464, 6,228,038, and 6,045,226 of Claessens (hereinafter Claessens) disclosed a system for detecting audience response to audio visual stimuli. The system disclosed in the patent requires a panel of viewers to watch the content and use a computer-based system to respond to it in real time. The viewer can register his or her likes or dislikes and qualitatively explain the response. The data is then used to evaluate the content. The key differences between Claessens' system and the current invention are that Claessens' system requires active participation from the audience and can measure the effectiveness of a piece of content but not of a whole content. The current invention is superior because it directly measures the viewer behavior, is more accurate, and does not require active participation from viewers.

In U.S. Pat. No. 6,045,226, Claessens disclosed a system for measuring the visual attention of subjects for a visible object. The disclosed system emits an invisible beam of light to scan the area of interest. The beam of light is reflected from the retina and/or cornea of said person(s) or animal(s). This reflected beam is used to estimate the direction in which the subject is looking and the duration of view. The system can be used to measure the duration for which a person looks directly at a signage. The key differences between Claessens' system and the current invention are that Claessens' system uses a specified source of radiation to measure the duration of view, and it cannot provide all of the data provided by the current system, such as segmentation and shopping behavior.

U.S. Pat. Nos. 5,227,874 and 6,443,840 of Von Kohorn (hereinafter Von Kohorn) disclosed a system for measuring the effectiveness of stimuli on decisions of shoppers, and a system for evaluation of responses of a participatory broadcast audience with prediction of winning contestants; monitoring, checking and controlling of wagering, and automatic crediting and couponing. The disclosed system focuses on measurement of a television audience, and uses a variety of monetary incentives to the respondents. The responses are collected electronically and then analyzed. The system disclosed by Von Kohorn's focuses on marketing strategies employed by the advertisers in broadcast and other out-of-store media, whereas the current invention focuses on strategies employed in-store. The system disclosed by Von Kohorn depends on response from a panel of participants for the data that forms the basis for analysis. The current invention is foreign to Von Kohorn because it directly measures the viewer behavior, is more accurate, and does not require active participation from viewers.

U.S. Pat. No. 7,116,716 of Ma, et al. (hereinafter Ma) disclosed a system and methods to generate a motion attention model of a video data sequence. The system is fundamentally different from the current invention because Ma focuses on the analysis of the video stream to identify durations of high activity (motion). Ma has assumed in the patent that durations of high activity in the video automatically translate into audience attention. The system disclosed in the current patent does not analyze the video stream; it directly measures the number of audience members who actually view, or pay attention to, the media.

U.S. Pat. No. 7,302,475 of Gold, et al. (hereinafter Gold) disclosed a system for measuring reactions to product packaging, advertising, or product features over a computer-based network. The system depends on a web platform to present different images to the respondents and collect their responses using online surveys. The current invention is different from the system disclosed by Gold because it does not depend on audience involvement, and the data is collected unobtrusively.

U.S. Pat. No. 5,991,734 of Moulson (hereinafter Moulson) disclosed a system for measuring the creative value in communications. The system relies on proactive participation from the respondents to collect feedback on creativity of the media. The current invention is different from Moulson's disclosed system because it does not depend on audience involvement, and the data is collected unobtrusively.

U.S. Pat. No. 7,374,096 of Overhultz, et al. (hereinafter Overhultz) disclosed a system for advertising compliance monitoring. The system uses RFID signals to detect the presence and absence of the audience members and of the marketing stimuli. Overhultz' system is different from the current invention because it can only detect the proximity of audience with the media, but it cannot tell whether the members actually engage with the media. Also, the system cannot collect data at the rate required to measure changes in audience population over a short multimedia clip.

SUMMARY

The present invention is a method and apparatus for evaluating relative effectiveness of content in a digital signage network. The present invention captures a plurality of input images of the people by a plurality of means for capturing images in the vicinity of at least a digital signage in the digital signage networks. For simplicity, the term "camera" will be used as an exemplary means for capturing images hereinafter. The plurality of input images are processed in order to measure the behavior patterns of each person in the people in response to a plurality of contents played in the digital signage.

"Copy testing" is the term used in industry for comparing and ranking different pieces of content. The evaluation of the digital media content is performed from the content design aspects, to design the optimal content mix for the digital signage. Typically such testing is done in a controlled environment, where respondents are shown the "copies" and their reaction is recorded using questionnaires or polling devices.

It is an objective of the current invention to eliminate respondent bias by capturing the audience behavior unobtrusively, in a real environment. The current system also gives us much larger sample sizes, thus increasing the statistical significance of the findings.

The present invention uses a series of measurements to compare and evaluate different contents. In other words, the present invention is a content rating system based on how the audience responds to the digital content in the intended context of digital media network in-store or in other public viewing areas.

The evaluation is based on a plurality of measurements that comprise:
Conversion ratio—percentage of the total available audience that noticed the content.
Temporal measurement with regard to the viewing time—measures the different parts of a piece of content in engaging the audience.
Segmentation—based on demographic groups, context of the location where the signage is placed, time-of-day, etc.
Emotion change detection—positive or negative reaction to the content.

Examples of the behavior measurement include the traffic count that measures the number of people in the vicinity of the digital signage or the impression level measurement that measures the actual number of people who were influenced by the content. An example of the conversion ratio can be a ratio from the traffic count to the impression level. The temporal measurement includes an average viewing length with respect to the play length and the percentage of completing the viewing. The present invention measures impression level of the people in response to the contents, based on temporal measurement of the interaction with the content. The emotion change detection measures emotion change of the people in response to the contents to see whether the contents had a positive or negative impact on the people.

In an exemplary embodiment, the present invention automatically measures a series of metrics with regard to the contents, such as behavior response to the contents. The present invention optimizes different aspects of marketing, using the shopper response measurement.

Relative measurement between two pieces of contents will show the effectiveness of one piece over the other. For example, a traffic measurement for a "content A" during a predefined window of time and another traffic measurement for a "content B" during the same window of time can show which content grabbed more attention from the audience.

The parameters along which the media content, e.g., an advertisement, are measured comprise: potential to get noticed, potential to be remembered, potential to register brand name in the viewer's minds, and potential to convey the message and product image.

The evaluation of the content can be performed by demographics, so that the result of the evaluation can tell us which set of contents or customized content mix is more appealing to a specific demographic group. This process helps in ranking different content so that it can be "copy tested" for different demographic groups. Different content or "copies" can do well in different demographic segments, thus one overall purpose is to select the winners for each targeted group—so that in a digital media network multiple contents can run at different times or at different locations to maximize the overall impact of the network.

In other words, the present invention allows the measurement of the response to the content for different segments—allowing for better planning of the content. The term "content mix" planning is about "which," "where," and "when" to play—maximizing the "air time" or the impact of the advertising time/media that is purchased on a digital signage network. It thus enables a sophistication that would also help in exploiting the true power of digital signage—which allows easy distribution of content for different groups of screens or programming for playing different content at different times for the same sponsor. The response measurement to the content by different segments helps the process of optimizing the advertising dollars.

In another exemplary embodiment, real-time copy testing can be performed, which virtually provides a dashboard so that many different creative directions can be dynamically tested, even with minor modifications (e.g., change of color, font sizes, etc.) to see the performance.

In an embodiment, the audience measurement data are calculated by aggregating the measurements for the behavior patterns of the people. The characteristic information is extracted from the audience measurement data and a media play log of the contents for the digital signage. The play log is synchronized with the audience measurement. Finally, the present invention measures the relative effectiveness of a content compared to at least another content in the plurality of contents at reaching a targeted audience, and the effectiveness of conveying the message based on a comparison of the characteristic information in response to the played contents.

As a method of the measurement, the present invention compares conversion rates in a funnel model of the people's engagement with products in response to the played contents. The present invention compares an average viewing length for content and the play length of the content and measures the completion percentage of viewing for each of the contents. The present invention calculates the sales and analyzes post-viewing behaviors in response to the content.

The present invention compares a set of contents in a comparable set of screens, simultaneously, for a synchronous measurement, or compares a set of contents in the same set of screens at different times, for an asynchronous case. The set of contents can be sampled by sampling representative contents that are played for a predefined window of time. The present invention evaluates the content in a context wherein the types of measurement are defined differently depending on the intended location of the digital signage.

DRAWINGS—FIGURES

FIG. 1 shows an exemplary application of a preferred embodiment of the present invention in an area.

FIG. 2 describes an exemplary audience data format.

FIG. 3 describes an exemplary media play log.

FIG. 4 shows an exemplary audience data filtration process.

FIG. 5 describes an exemplary impression analysis process.

FIG. 6 describes an exemplary chart showing aggregation of different types of impressions for a piece of content.

FIG. 7 describes an exemplary chart for separating different types of impressions for more detailed analysis.

DETAILED DESCRIPTION OF THE INVENTION

Figure 1:
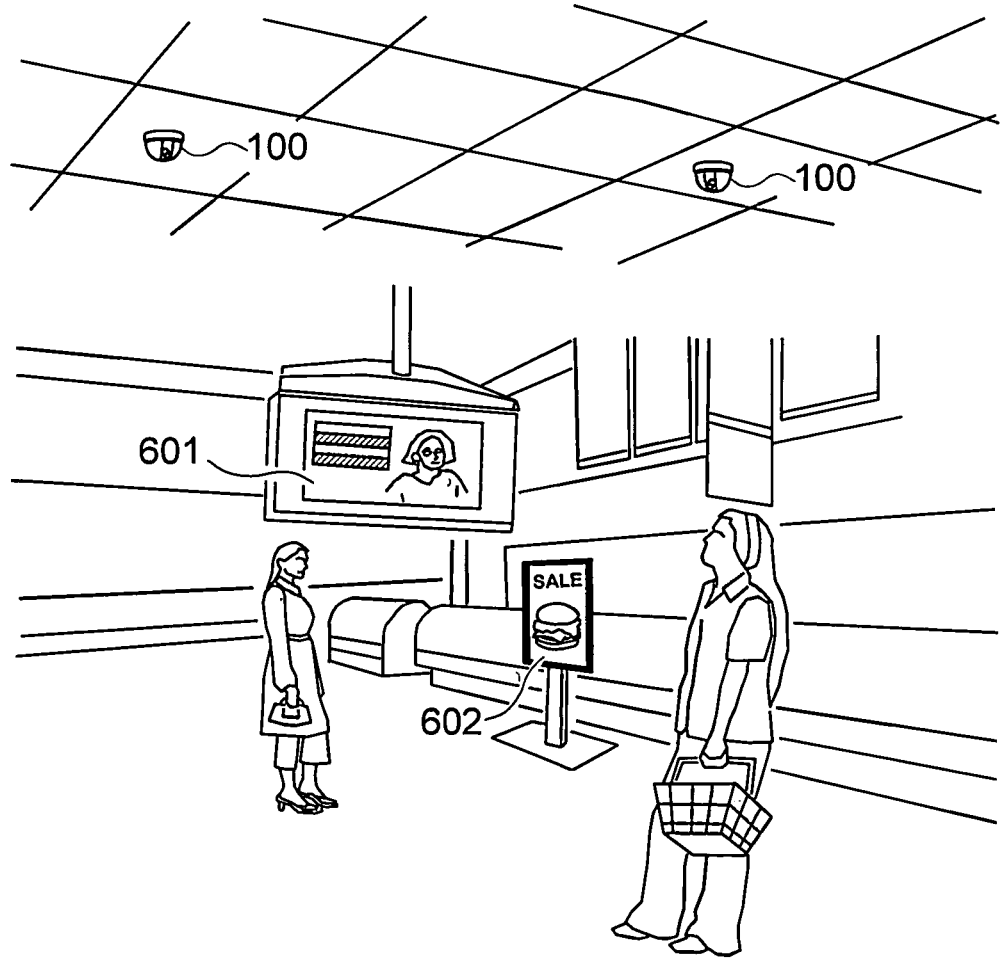

FIG. 1 shows an exemplary application of a preferred embodiment of the present invention in an area, wherein the exemplary application comprises an exemplary implementation of digital signage network for multiple media content, i.e. 601 and 602, with a plurality of means for capturing images 100, such as cameras. The audience measurement system, i.e. video processing unit(s) (VPU) for each node, processes the input images captured by the plurality of means for capturing images 100.

A digital signage network is a network of digital screens installed in different shopping areas. The primary goal of digital signage, e.g., 601 and 602, is to communicate with the shoppers outside their homes and help them make desired purchasing decisions. One key step in reaching the end goal of the digital signage is creating content that can attract and engage the shoppers.

It is important for a new business application to conduct "copy testing" of the content. The term "copy testing" is used in industry for content evaluation. Usually, they have a number of creative pieces on video tapes, which are sent to the participants or shown to them in a theater, and then their response is recorded.

One of the key steps for the evaluation is to evaluate digital media content with regard to some other contents that are played in a digital signage. The evaluation of the digital media content is performed from the content design aspect, so that the evaluation teaches us the optimal content mix for the digital signage.

The present invention is a method and system for evaluating relative effectiveness of content in a digital signage network, using a series of measurements to compare and evaluate different contents. In other words, the present invention is a content rating system based on how shoppers respond to the digital content in the intended context of digital media network in-store or in other public viewing areas.

The current invention measures effectiveness of individual pieces of content based on the measurement of their ability to attract the audience members and retain their attention. Different pieces of content can be compared and ranked based on the indices produced by this invention.

The evaluation is based on a plurality of measurements that comprise:
  behavior measurement and calculation of conversion ratio,
  secondary behavioral impact/motivation measurement,
  temporal measurement with regard to the viewing time,
  segmentation, such as demographic groups,
  emotion change detection, and
  impression level detection.

Examples of the behavior measurement include the traffic count that measures the number of people in the vicinity of the digital signage or the impression level measurement that measures the actual number of people who were influenced by the content. An example of the conversion ratio can be a ratio from the traffic count to the impression level. The temporal measurement includes an average viewing length with respect to the play length and the percentage completing the viewing. The secondary behavioral impact/motivation measurement includes sales and post-viewing behaviors after people make a contact with the content. The present invention measures impression level of the people in response to the contents, based on temporal measurement of the interaction with the content. The emotion change detection measures emotion change of the people in response to the contents to see whether the contents had a positive or negative impact on the people.

In an exemplary embodiment, the present invention automatically measures a series of metrics with regard to the contents, such as behavior response to the contents. The present invention optimizes different aspects of marketing using the shopper response measurement.

Relative measurement between two played media contents will show the effectiveness of content over another. For example, a traffic measurement for a "content A" during a predefined window of time and another traffic measurement for a "content B" during the same predefined window of time can show which content grabbed more attention from the audience.

The parameters along which the media content, e.g., an advertisement, are measured comprise:
1) potential to get noticed,
2) potential to be remembered,
3) potential to register brand name in the viewers minds, and
4) potential to convey the message and product image.

The evaluation of the content can be performed by demographics, so that the result of the evaluation can tell us which set of contents or customized content mix is more appealing to a specific demographic group.

This process helps in ranking different content so that it can be "copy tested" for different demographic groups. Different content, or "copies," can do well with different demographic segments. Thus, one overall purpose is to select the winners for each targeted group—so that, in a digital media network, multiple contents can run at different times or at different locations to maximize the overall impact of the network.

In other words, the present invention allows the measurement of the response to the content for different segments—allowing for better planning of the content. The term "content mix" planning is about "which," "where," and "when" to play—maximizing the "air time" or the impact of the advertising time/media that is purchased on a digital signage network. It, thus, enables a sophistication that would also help in exploiting the true power of digital signage—which allows easy distribution of content for different groups of screens or programming for playing different content at different times for the same sponsor. The response measurement to the content by different segments helps the process of optimizing the advertising dollars. Through a better content mix planning based on the measurement, various combinations of contents in the content mix can run at different times or at different locations to maximize the overall impact of the contents.

In another exemplary embodiment, real-time copy-testing can be performed, which virtually provides a dashboard so that many different creative directions can be dynamically tested, even with minor modifications (e.g., change of color, font sizes, etc.) to see the performance. It is like a real-time voting system with a "panel" of real consumers in a real context.

In an embodiment, the audience measurement data are calculated by aggregating the measurements for the behavior patterns of the people. The characteristic information is extracted from the audience measurement data and a media play log of the contents for the digital signage. The present invention synchronizes the play log with the audience measurement. Finally, the present invention measures the relative effectiveness of a content compared to at least another content in the plurality of contents at reaching targeted audience and the effectiveness of conveying the message based on a comparison of the characteristic information in response to the played contents.

The behavior measurement can be performed along with a funnel model with regard to the contents. A funnel model is defined as a model for interaction or engagement level of audiences with the media content, product, or product category. The model comprises multiple layers that represent different level of interaction or engagement of the people. For example, the layers can represent "traffic", "attraction", "engagement", and "purchase", from the lowest layer to the highest layer in the funnel model. In this approach, the conversion rates between each interaction/engagement level in the funnel model are correlated with the effectiveness of the contents in influencing the audience in each interaction level. For example, among the played contents A and B, a more effective content can be selected by comparing the conversion rates of the interaction/engagement with the product category that are tied to the contents.

The present invention also measures and compares conversion rates in a funnel model of the people's engagement with products in response to the played contents. The conversion index will help in evaluating and improving the content. For example, the content could be funny and engaging, but it may not "move" or "motivate" buying. Based on the conversion index, the content can be customized to actually impact/influence a purchase.

The present invention compares an average viewing length of content and the play length of the content and measures the completion percentage of viewing for each of the contents. The present invention calculates the sales and analyzes post-viewing behaviors in response to the content.

The present invention compares a set of contents in a comparable set of screens, simultaneously, for a synchronous measurement. The present invention can also compare a set of contents in the same set of screens at different times, for an asynchronous case. The set of contents and the set of screens can be selected for representative samples in the measurement space, and the measurement can be performed for a period of time long enough to get a good audience sample.

The evaluation is performed in a context. For example, depending on the intended location, the types of measurement can be defined differently. The spatial contextual information where the digital media/signage is placed can provide unique attributes that affect the performance of contents. Therefore, the present invention customizes the measured metrics according to the contextual information, including intended location and audience. The present invention also factors in the network's ability to attract and engage audience irrespective of the content. This process helps in normalizing the value of the final output, i.e., ratings. With regard to the set up of the system for the same place/different times and same time/different place measurement, the present invention selects a set of screens that best capture the context of the network.

The range of measurement can cover all media content, but the present invention also measures a subsection of media using different criteria depending on the measurement purpose.

FIG. 2 describes an exemplary audience data format.

The exemplary audience data has two parts—traffic data 674 and impressions data 676. Traffic data has a record for every person that comes in front of a node in a digital signage network. A node is composed of one or more digital signage. It has rows for unique ID, start time (time when the audience member comes in the vicinity of the node), end time (time when he or she leaves the vicinity of the node), dwell time (difference between start and end time), and impression (whether or not they viewed the node). There can be other columns, if necessary, such as a column for emotion change.

For every person who viewed the node, there will be a record in the impressions data. The impressions data will have columns for unique ID, start time of the impression, end time of the impression, impression length (difference between start and end time), gender of the viewer, age of the viewer, and ethnicity of the viewer. There can be other columns, if necessary.

The data is aggregated into fixed intervals of time, to get counts of audience available to a node 640, i.e., one or more digital signage, that is tested, and to measure the effectiveness of the contents that are played in the node.

FIG. 3 describes an exemplary media play log.

In an exemplary embodiment of the present invention, each node will have a media play log, e.g., 663, which will have a record of every piece of content played on the node. These are individually referred to as content. The contents are played repeatedly on a set of networks for a given period of time. The time slots in which a piece of content is played on a screen are called ad spots. Each ad spot has a start time, an end time, and the name of the content associated with it.

A record of all of the ad spots is called a media play log for that screen 663. It will have columns for start time, end time and content description. The media play log is filtered to remove all of the content that is not a part of the contents being measured. The filtered play log can be described as a Boolean graph, which is on every time a tested content is played. This gives us the play log of the tested content 641.

Figure 4:
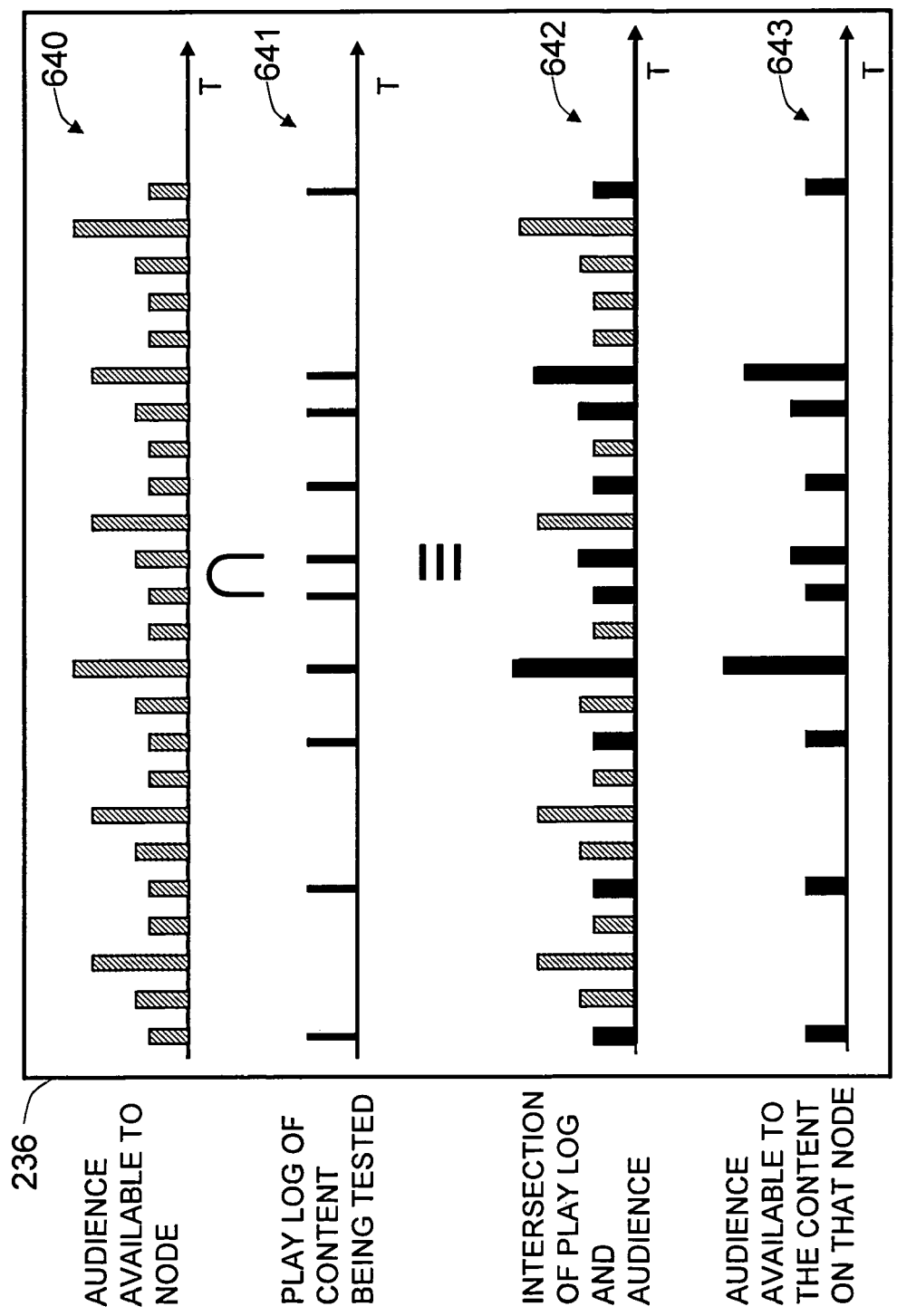

FIG. 4 shows an exemplary audience data filtration process 236.

The present invention starts with the screen-level audience data 640 and screen-level content data based on the play log of content that are tested 641. By intersecting the audience data with the play log, we get the "intersection of play log and audience" 642. The audience data not specific to the given content is removed to get filtered audience data 643. The distribution of filtered audience data can be used to describe any audience-related measurement, e.g., traffic, impression count, impression length, emotion changes, etc. This data forms the basis of different analyses.

Exact timestamps from the media player are used to synchronize the player and vision processing unit (VPU) clocks. The "playlist" from the player is used to match the measurement with the contents at the specific duration of the measurement.

Figure 5:
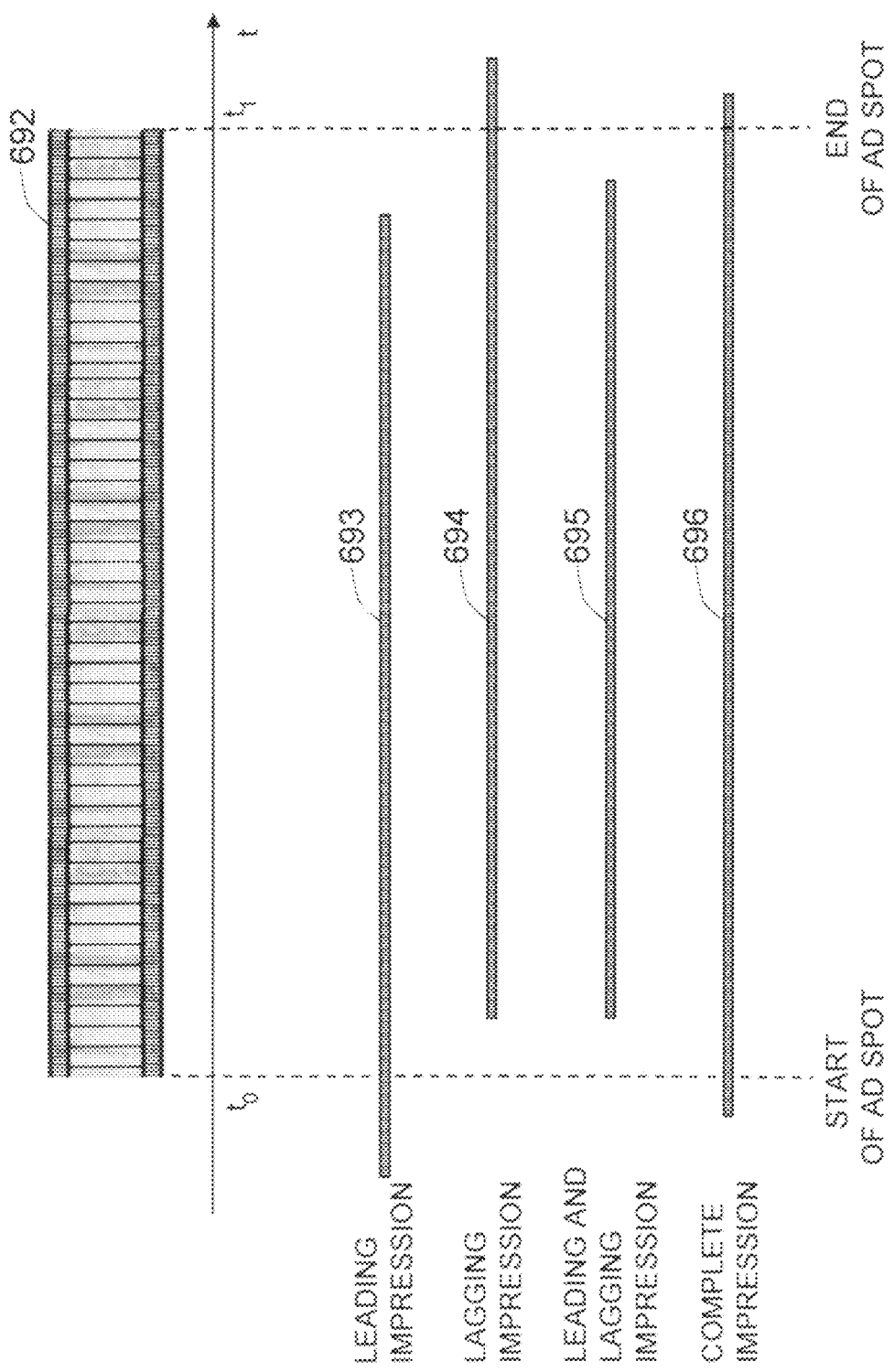

FIG. 5 describes an exemplary impression analysis process.

Impression measurement is an important part of the behavior measurement. The impression level measurement measures the actual number of people who were influenced by the content by counting the number of viewers for the tested content.

The types of impressions based on time can comprise:

1) Leading impressions 693 that started before or at the same time as the ad spot 692 began, but ended before the end of the ad spot 692, 2) Lagging impressions 694 that started after the ad spot 692 began and ended at the same time or after the ad spot 692 ended, 3) Leading and lagging impressions 695 that started after the ad spot 692 began and ended before the ad spot 692 ended, and 4) Complete impressions 696 that started before or at the same time as the ad spot 692 began and ended at the same time or after the ad spot 692 ended, The unique data collection method used for data collection allows us to measure the audience data at a very fast rate—multiple times every second. Therefore, we can collect data for individual frames or groups of frames within the piece of content.

Figure 6:
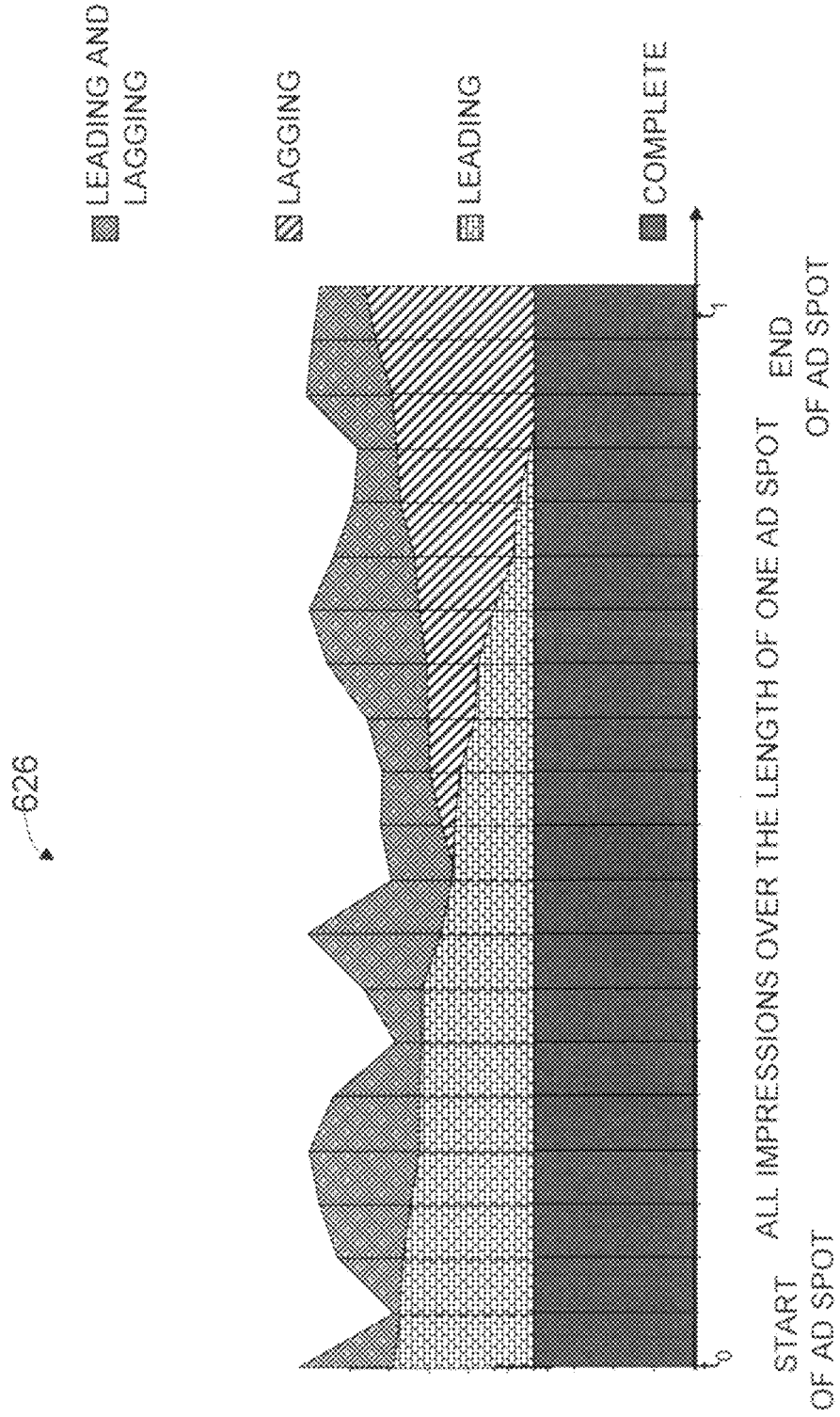

FIG. 6 describes an exemplary chart 626 showing aggregation of different types of impressions for a content.

Whenever a content is played, a given number of audience members view it. As the content is played during multiple ad spots on multiple screens during a given time period, a large number of audience members have an opportunity to view it. The audience impression data from all of these ad spots are aggregated to build the chart shown. The actual number of ad spots included in the analysis is decided based on the sample size required for analysis. Also, a large sample size allows us to segment the audience into smaller groups based on different parameters, such as demographics, location type, time-of-day, etc.

Figure 7:
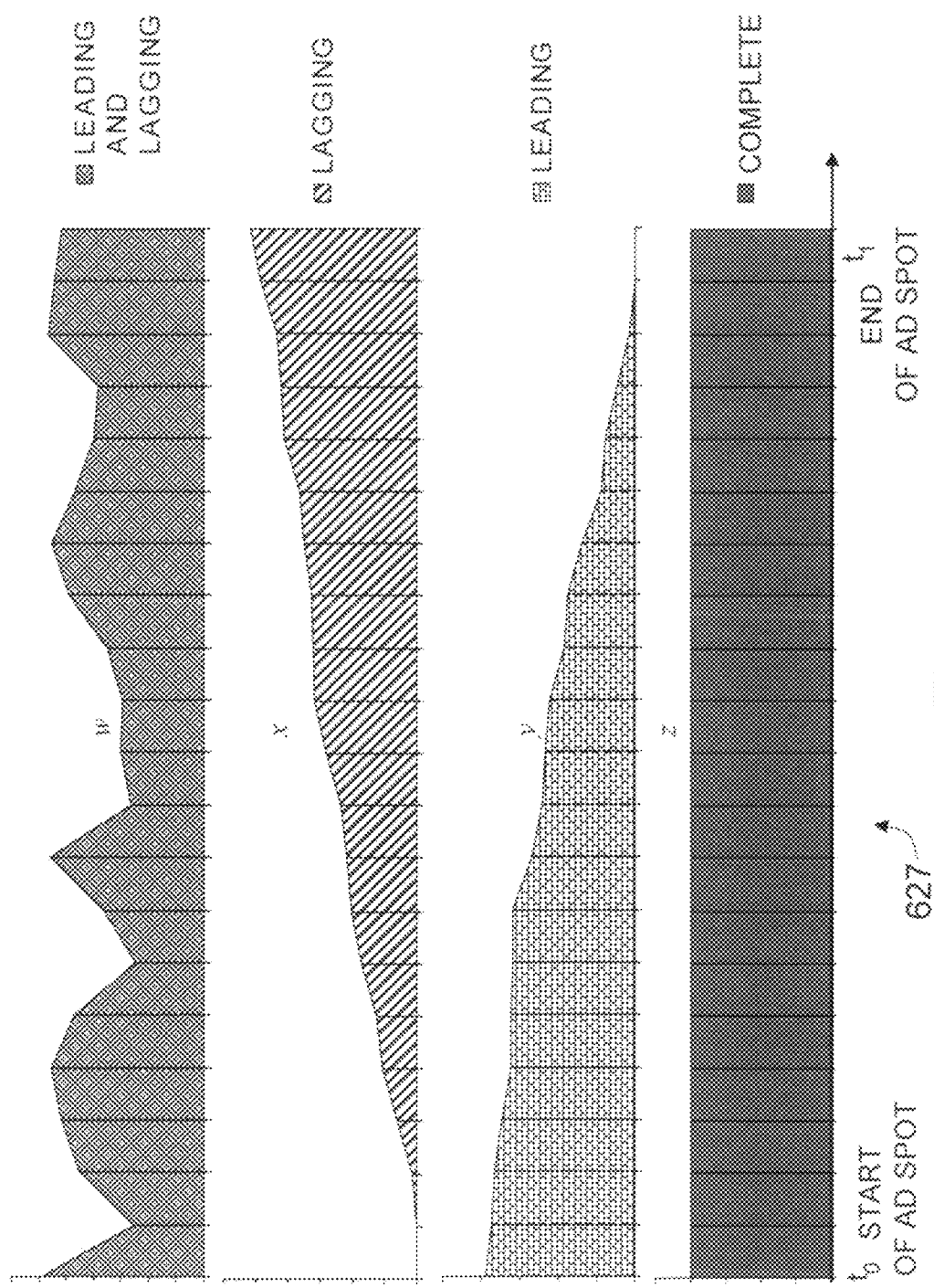

FIG. 7 describes an exemplary chart 627 for separating different types of impressions for more detailed analysis.

The impressions gathered at the end of the previous step are then segregated based on their type. We use regression analysis to arrive at the best fit curve for each of the impression types. The curves w, x, y, and z are a function of time.

The curve for leading and lagging impressions—"w"—can have any shape, because the impressions can start and end at anytime during the length of the ad spot.

The curve for lagging impressions—"x"—is always an upward sloping curve that starts from zero after the start of the ad spot, because all of the lagging impressions start after the ad spot began and end at the same time or after the ad spot ends.

The curve for leading impressions—"y"—is always a downward sloping curve that reaches zero before the end of the ad spot, because all of the leading impressions start before or at the same time as the ad spot began, but end before the ad spot ends.

The curve for complete impressions—"z"—is always a straight line parallel to the time axis, because all of the complete impressions start before or at the same time as the ad spot began and end after or at the same time as the ad spot ends.

Exemplary formulas that calculate the average number of impressions according to the various impression types are as follows:

$$\text{LAGGING AND LEADING IMPRESSIONS} = W = \frac{\int_0^1 w\,dt}{t_1 - t_0} \quad (1)$$

$$\text{LAGGING IMPRESSIONS} = X = \frac{\int_0^1 x\,dt}{t_1 - t_0} \quad (2)$$

$$\text{LEADING IMPRESSIONS} = Y = \frac{\int_0^1 y\,dt}{t_1 - t_0} \quad (3)$$

$$\text{COMPLETE IMPRESSIONS} = Z = \frac{\int_0^1 z\,dt}{t_1 - t_0} \quad (4)$$

where w, x, y, z are the curves representing the trend in number of lagging and leading, lagging, leading, and complete impressions counted at a given instant respectively, and W, X, Y, Z are the average number of lagging and leading, lagging, leading, and complete impressions counted at a given instant, respectively.

The curves w, x, y, and z are integrated over time to get the average number of impressions for each type of content.

Another way to approximate the average number of impressions of each type is to divide the ad spot into a finite number of equal time periods, measure the average number of impressions for the time periods, and then calculate the average of the average number of impressions across all time periods.

An exemplary formula that calculates a content effectiveness score can be as follows:

$$S = \alpha * W + \beta * X + \gamma * Y + \delta * Z \quad (5)$$

where S is the content effectiveness score, and $\alpha, \beta, \gamma, \delta$ are the coefficients assigned to W, X, Y, Z, respectively.

The scoring system can be modified to by assigning different values to the coefficients—$\alpha, \beta, \gamma,$ and $\delta$. The coefficients can have any value, including negative values. The values will be decided based on the goals of the content.

Different values of "S" can be calculated for different audience segments—demographics, location, time-of-day, day-of-week, etc.—for comparison.

Other important parameters that will be used to understand the effectiveness of the content are:
The points in the timeline when the most "lagging" impressions and "leading and lagging" impressions start, and
The points in the timeline when the most "leading" impressions and "leading and lagging" impressions end.

Figure 8:
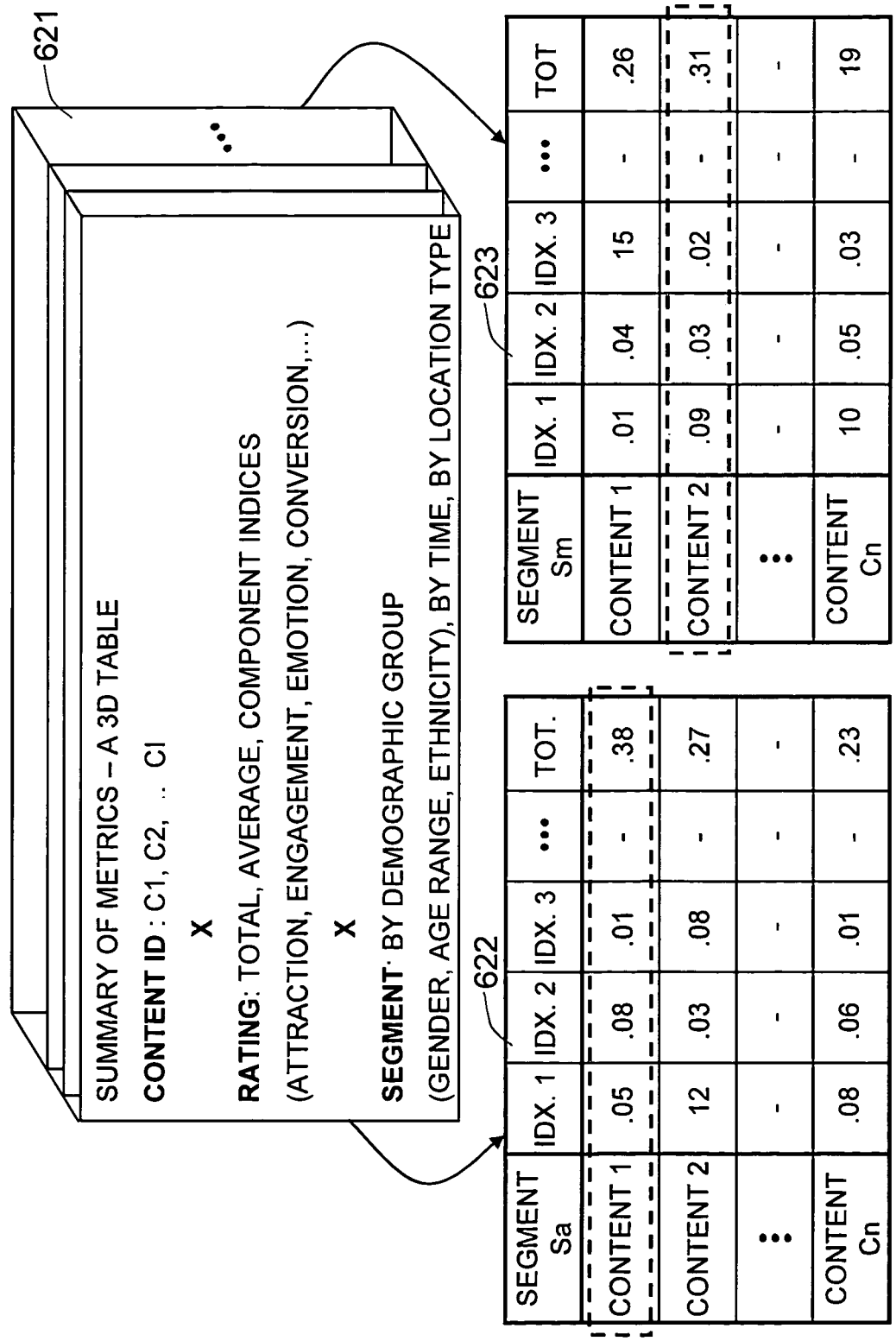
FIG. 8 shows exemplary metrics that are produced by the present invention.

FIG. 8 shows exemplary metrics that are produced by the present invention.

As the output of the evaluation, the present invention can rank the measured contents according to the ratios among many dimensions, based on predetermined criteria.

The measurements and calculations of the ratings are produced for the following indices:
Attraction index, defined as the percentage of the location traffic that at least notices the content. Location traffic comprises all of the people that pass through the viewing area of the digital signage. An audience member is said to notice the digital signage if he or she directly looks toward the screen from the viewing area of the digital signage.
Engagement index, defined as the percentage of audience members that notice the screen and engage with it. An audience member is said to engage with the digital signage if he or she looks toward the screen for more than a given duration.
Emotion change index, defined as the change in the audience member's emotion during the time when they were looking toward the digital signage.
Behavior Index, defined as the change in the behavior of the location traffic when the content was being played. Some examples of behaviors are:
dwell time—increase or decrease in the total time audience members spend in the viewing area of the signage,
product sales—increase or decrease in the sale of the products advertised on the signage,
recall—the percentage of audience members who are able to recall the details of the content when interviewed,
brand linkage—the change in attitude of the audience members toward the products displayed or advertised on the digital signage, and
perceived wait time ratio—the ratio of the actual dwell time to the perceived dwell time in the viewing area of the signage. Data on perceived dwell time is gathered by asking a sample of audience members to estimate the amount of time they spent in the viewing area.
Average impression duration—the average duration for which all audience members look toward the signage while the content was being played.

The index can be broadly defined to incorporate various other desired behaviors, e.g., filling form, etc. The present invention is an automated content evaluation/rating system in a preferred embodiment, so some of the indices above are optionally created in association with the output of the present invention. For example, the content rating produced by the present invention can be used in association with an interview to measure the recall rating.

The metric for the indices comprises percentages of the audience that are measured for each index. For example, it can be the percentage of the audience who saw at least 75% of the content during a predefined window of time, Ti.

The exemplary 3D table 621 shows exemplary ratings that are calculated for the indices of exemplary metrics, in consideration of the contents during a window of time per segment group, such as a demographic group. As the table for segment Sa 622 and the table for segment Sm 623 show, the overall rating of content 1 was more appealing to the segment group Sa than other contents that were played during the time period, while the overall rating of content 2 was more appealing to the segment group Sm during the same time period.

Figure 9:
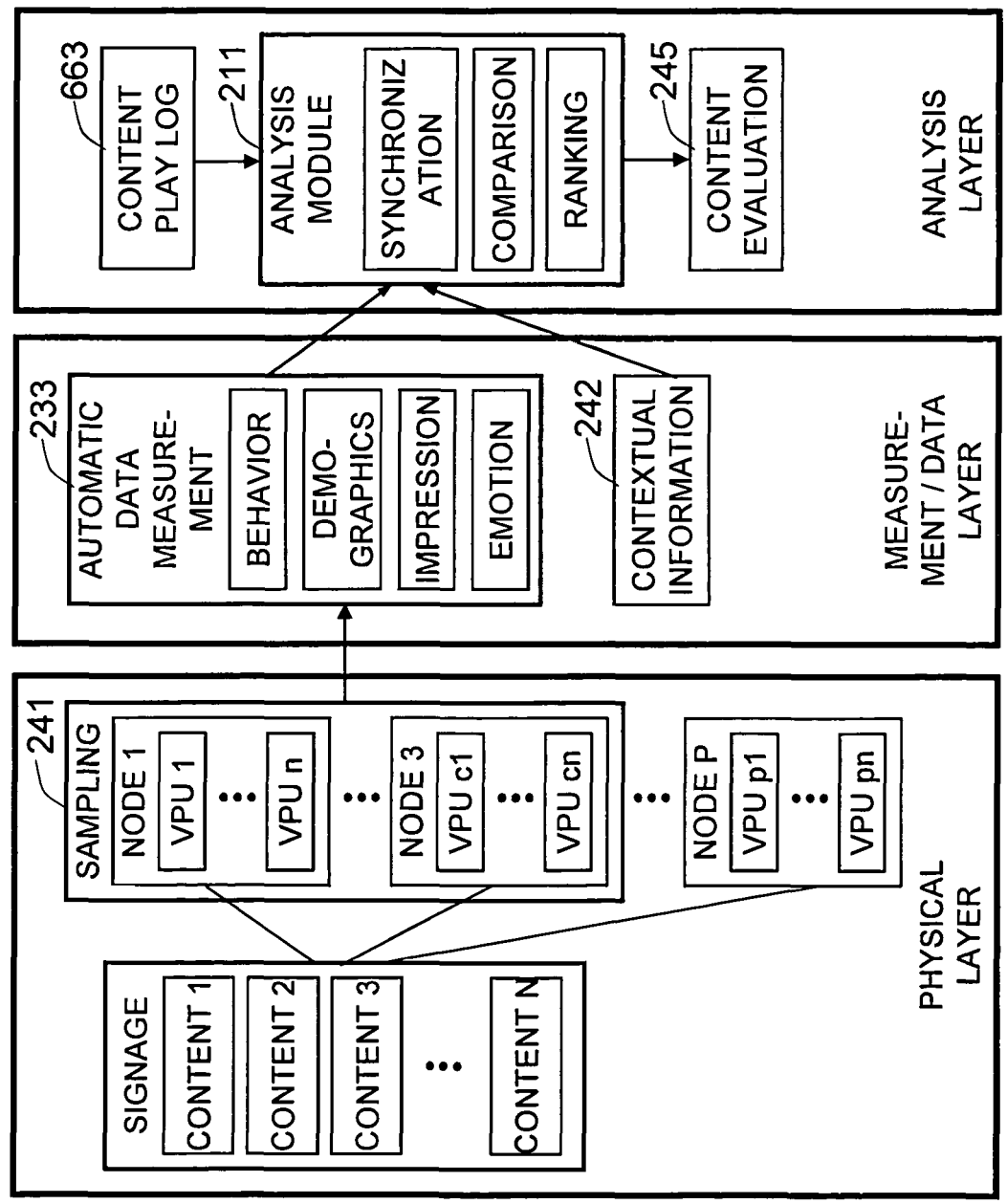
FIG. 9 shows exemplary layers that comprise key modules and components of the present invention.

FIG. 9 shows exemplary layers that comprise key modules and components of the present invention.

The first layer is the physical layer, consisting of nodes and video processing unit(s) (VPU) for each node. A node is composed of one or more digital signage, which plays one or more media content. The VPUs consist of a plurality of means for capturing images 100, such as cameras, installed in the retail space and connected to servers. The servers or the VPUs can convert the video stream into audience data, including behavior and demographics. Some other types of specialized hardware may be used to perform this step. The plurality of means for capturing images 100 are set up in a way to cover a portion of the physical space in the vicinity of digital signage under consideration. The plurality of means for capturing images 100 may be installed in a sample of locations to build a representative sample.

The second layer is the measurement and data layer. The VPUs use automated video processing 233 algorithms to convert video into audience data. The audience data can comprise behavior, demographics, emotion, and impression data.

Behavior data consists of the actions performed by the audience, such as duration of time standing in front of a media content, visits to specific store sections in association with the media content, products with which the audience interacted after viewing the media content, etc. The demographic data consists of an audience profile, such as age, gender, and ethnicity. The data will be used to segment the audience into logical groups based on the advertisers' needs. The emotion data consists of the emotional changes of people in response to the stimulus. The impression data measures the level of impression by the audience, by counting the actual viewers of the media content or measuring the average viewing time of the media content by the viewers.

The data can be further augmented by combining contextual information 242 that enhances the value of analytics. Examples of such data points include, but are not limited to, spatiotemporal information of the node where the media content is played, environmental information, and media consumption information about the expected audience members in the specific geographical location. This contextual information 242 can be pre-stored in a database, and then combined with the audience measurement data to produce an intelligent analysis in a specific context.

The third layer is the analysis layer. The analysis module 211 synchronizes the content play log 663 with the audience measurement data and compares the contents based on the comparison criteria. The analysis modules 211 rank the contents based on their performance. For example, the contents can be ranked according to the order of impression-level counts per segmentation. The final content evaluation 245 produces the result of the analysis.

The present invention can sample 241 the nodes in a media network and extrapolate the result throughout all the nodes in the media network. In this case, the actual audience data, generated from the sample nodes, is used to extrapolate the audience data and generate the estimated audience data for the entire network. The analysis module 211 uses the outputs from the measurement layer and cleans the data by removing corrupt or incomplete data sets. It then combines the data with applicable statistical parameter models, such as distributions, and produces an audience data set. The audience data set includes estimated audience measurement for every unit in the physical space. The dataset is converted to the metrics for the content evaluation.

Figure 10:
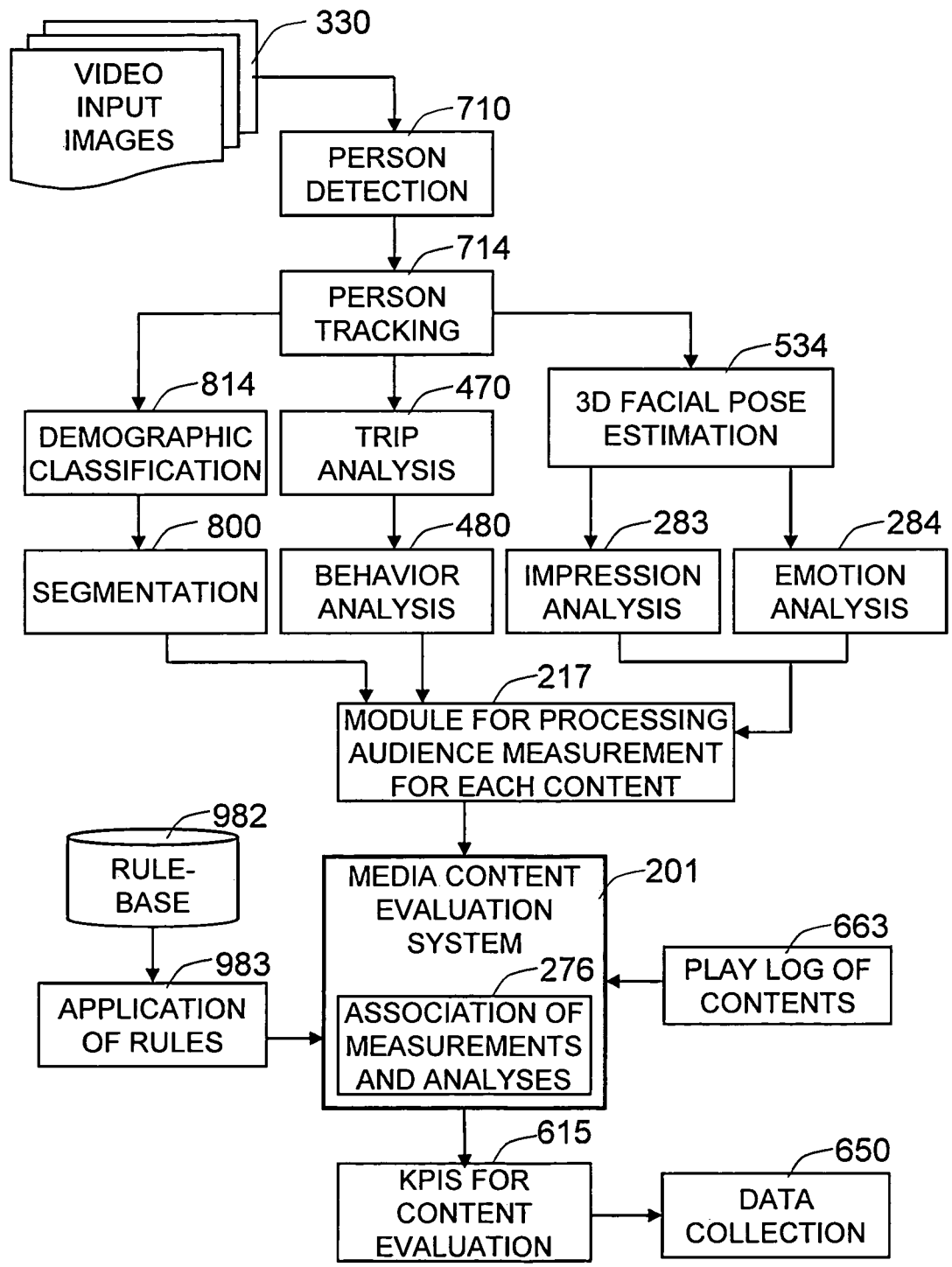
FIG. 10 shows exemplary details of processes for audience measurement.

FIG. 10 shows exemplary details of processes for audience measurement, especially in the measurement and data layer, in which computer vision-based behavior analysis 480 and segmentation 800 measurement, i.e., demographics classification 814, impression analysis 283, and emotion analysis 284, are combined in an exemplary embodiment of the invention.

In the exemplary embodiment shown in FIG. 10, the present invention detects 710 and tracks 714 a person from the audience in the video input images 330, from a plurality of means for capturing images 100. The present invention can join the trajectories of the person tracks from a video of a means for capturing images 100 to another video of a means for capturing images 100 while the person appears and disappears between the fields-of-view among a plurality of means for capturing images 100. Based on the tracking information, the present invention performs the trip analysis 470 of the particular person. The trip analysis 470 can be used as one of the ways to process the behavior analysis 480 of a person and obtain useful information about the person's behavior, such as engagement behavior with the digital content.

The present invention can utilize any reliable video-based tracking method for a person in the prior art, in regard to the behavior analysis. For example, U.S. Pat. No. 8,009,863 of Sharma, et al. (hereinafter Sharma U.S. Pat. No. 8,009,863) disclosed an exemplary process of video-based tracking and behavior analysis for people in a physical space based on the information for the trip of the people, using multiple means for capturing images in a preferred embodiment of the invention.

The present invention can also process segmentation 800 of the audience, based on the images of the audience in the video. Demographic classification 814 is an exemplary segmentation 800 of the audience.

The present invention can utilize any reliable demographic composition measurement method in the prior art as an exemplary video-based segmentation of the audience. For example, U.S. patent application Ser. No. 11/805,321 of Sharma, et al. (hereinafter Sharma Ser. No. 11/805,321) disclosed an exemplary demographic composition measurement based on gender and ethnicity.

The present invention can organize the measurement of the response to the content based on the segmentation and trip type analysis of the people. The segmentation comprises demographic segments, including age range, gender, and ethnicity. The trip type comprises the trip pattern of the people in the vicinity of the digital signage.

The segmentation 800 and behavior analysis 480 data can be collected at a sample of nodes in the network. The data is sent to the content level audience data measurement module, where the data is extrapolated to produce estimated audience measurement of each node or signage in the network with regard to the contents. A module for processing estimated audience measurement for each content 217 reformats and transfers the data to the media content evaluation system 201, where the audience measurement data is combined with the media play log 663 to associate and analyze 276 the exposure-related measurements and attitude-related measurements for the media content. Using the exposure-related measurements and attitude-related measurements together, the media content evaluation system 201 produces the key performance indicators (KPIs) for content evaluation 615.

Impression analysis 283 and emotion analysis 284 are carried on images of the audience for an ad spot to measure the attitudinal impact that the content has on the audience. A sample of ad spots is selected from the content for impression and emotion analysis to generate attitude-related measurements for the media content.

In the exemplary embodiment of the present invention, the impression can be defined in two ways: 1) time spent by the audience looking at the display, or 2) time spent by the audience standing close to the display. The analysis of the total impression time accumulated by the content is used for measuring the effectiveness of the content.

In another exemplary embodiment, the impression measurement can be defined in two different levels. The first level of the impression measurement is to count and measure the impression length, and the second level of the impression measurement is deeper impression analysis.

With regard to the impression measurement, especially for the first level of impression count and measurement, the present invention can utilize any well-known impression measurement method. U.S. patent application Ser. No. 11/818,554 of Sharma, et al. (hereinafter Sharma Ser. No.

11/818,554) disclosed details of a system for measuring the impression level through the viewership of an audience. An exemplary embodiment of the present invention, shown in FIG. 10, can utilize Sharma Ser. No. 11/818,554 for the first level of impression measurement in the impression analysis 283, especially utilizing the 3D facial pose estimation 534. Further, the second level of the impression measurement can be achieved by correlating the first level of impression data with the behavior analysis or demographic segmentation. For example, the first level impression measurement data can be sorted according to the behavior types or demographic segmentation results, which provide a deeper understanding of the impression of the audience, depending on the particular behavior type or the demographic group.

The impression analysis 283 and emotion analysis 284 measurements are very important for understanding the impact of the media content on the people. The measurements can teach us to understand whether the media content was engaging enough to hold the attention of the people, and whether the media content produced the desired emotional change in the people.

In an exemplary embodiment, the impression analysis 283 module can utilize other variables to measure the deeper level of impression. The other variables can comprise the relationship of the media content with other media contents during the measured time period, demographic segmentation, and temporal attributes.

For example, a more than average number of impression counts for a media content in relation to a specific demographic group indicates that the media content was able to attract and engage the specific demographic group in a particularly meaningful pattern. Likewise, the impression count data can be analyzed to measure the impact to each predefined demographic group in relation to the particular media content. Each metric gives a measure of response to the media content as a whole and individual graphics.

The emotion analysis 284 module measures the emotional response people have to a given media content. When a person engages with a media content, his or her facial expression could change in reaction to the media content. A set of video input images 330 is provided to the emotional change detection sub-module that measures the magnitude of the emotional change.

Several approaches exist for analyzing static images of faces to track the expressions and estimate the emotional state of a person. For example, J. F. Cohn, A. J. Zlochower, J. Lien, and T. Kanade, "Automated face analysis by feature point tracking has high concurrent validity with manual FACS coding," Psychophysiology, pp. 35-43 1999 (hereinafter Cohn), focuses on classification of static images of the face, which are associated with expression of particular emotions. Several approaches have also been reported for analyzing a sequence of images for facial expression analysis and estimating the emotional state of a person. For example, I. A. Essa and A. P. Pentland, "Facial expression recognition using a dynamic model and motion energy," presented at International Conference on Computer Vision, June 1995 (hereinafter Essa) disclosed an automated system for facial expression detection using optical flow coupled with a physical model of face muscles to describe the facial motions, and Y. Yacoob and L. S. Davis, "Recognizing Human Facial Expression," University of Maryland, Technical Report CS-TR-3265, May 1994, (hereinafter Yacoob) followed a three-level recognition approach based on the optical flow of points with high gradient values. The above methods aim at classifying low-level facial expressions into FACS type Action Units (AUs).

The present invention can utilize an approach for measuring the change in emotion in response to a media content from an analysis of the change of the facial expression, as suggested in Cohn and Essa. Specifically, the present invention can detect a positive or negative change in the "valence" of the emotion so that it can be used as a measure of persuasiveness of the media content.

The measured data can be stored in a database at the data collection process 650. The analysis of the measured data can be further facilitated by applying 983 a set of predefined rules in a rule base 982.

Rule Application Logic Module

In the present invention, the analysis of the measured data can be further facilitated by applying 983 a set of predefined rules for the media content evaluation in a rule base 982 through a rule application logic module. The rule application logic module can enable a dynamic rule application rather than relying on an ad hoc solution or static hard-code in translating the measured data.

An exemplary rule application logic module can be implemented utilizing the information unit verification technologies in U.S. Pat. No. 7,904,477 of Jung, et al. (hereinafter Jung).

The rule application logic module enables the adjustment in the analysis and extraction of characteristic information to be done in a structured and dynamic way. The exemplary parameter models, such as the analysis formula and statistical model, can be dynamically adjusted based on the rule application logic module.

In an exemplary embodiment, the rule application logic module constructs a characteristic information extraction criteria based on a set of predefined rules. The rule application logic module can further construct the criteria based on a combination of a set of predefined rules, in which the analysis of the data can be performed in further detail. The rule application logic module can further define domain-specific criteria for the media content evaluation.

The rule application logic module can facilitate the process of producing a unified and standardized media content evaluation, by normalizing the variance within the predefined thresholds. For example, if a measurement for a media content is skewed due to less desirable environmental factors, the differences can be adjusted by applying normalization offset values to the differences within predefined thresholds using the rule application logic module. Then, the analysis can take this into consideration at the final analysis of the media content evaluation.

The usage of the rule application logic module can differentiate the levels of measurement and analysis of the media content evaluation, where a first set of criteria are applied throughout the preliminary data, and a second set of criteria are applied to the next level of data for a complicated analysis, in order to serve specific needs of the complicated analysis. An exemplary first set of criteria can typically comprise common criteria throughout all of the media contents, and the second set of criteria is typically different from the first set of criteria.

Figure 11:
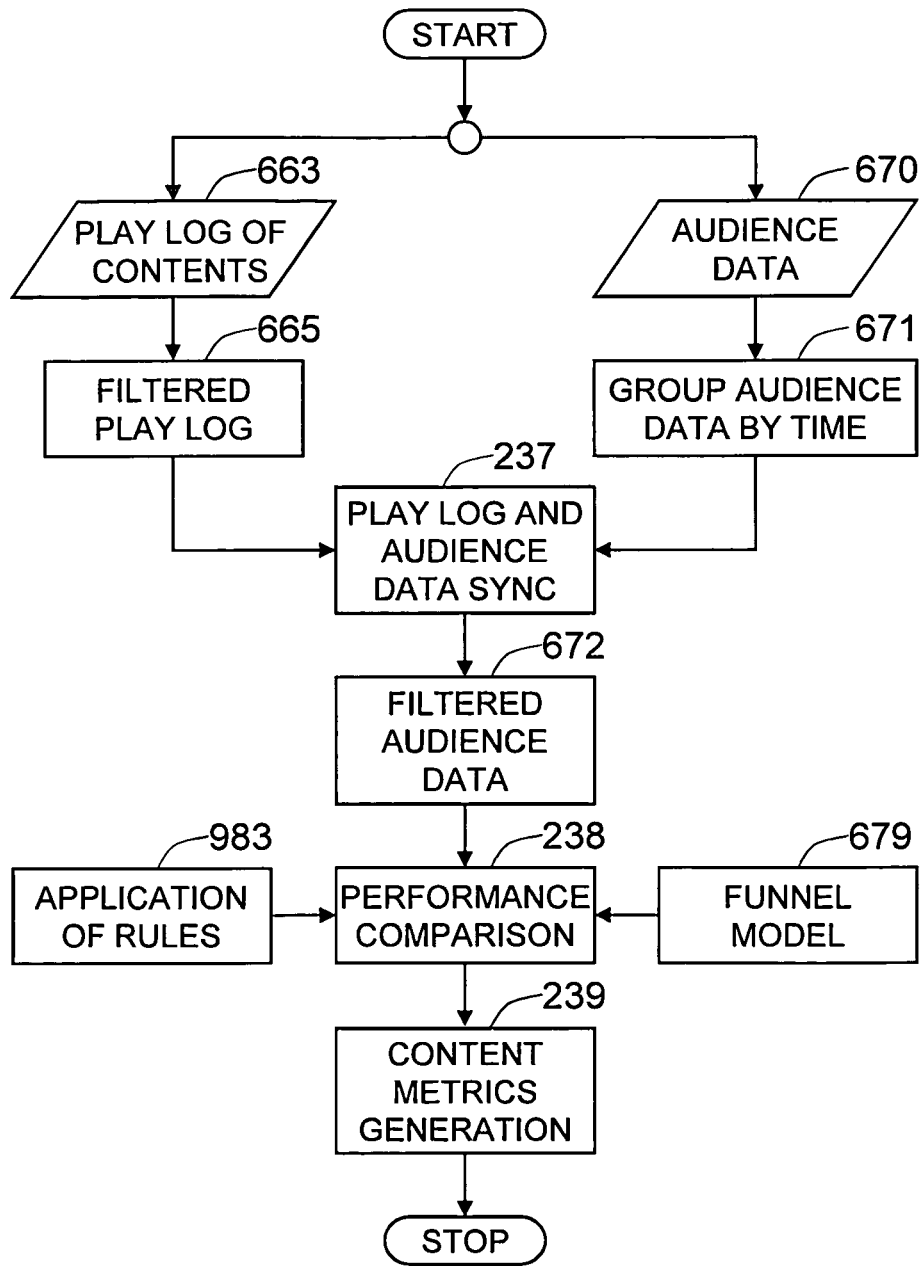
FIG. 11 shows exemplary details of content evaluation based on the synchronization of audience measurement and play log of content.

FIG. 11 shows exemplary details of content evaluation based on the synchronization of audience measurement and play log of content.

The audience data 670 is aggregated by a given unit of time 671—hour or day or any other unit of time, using an audience data grouping module. The process also calculates the counts of audience available to the node or signage for the target content. Dwell time and impression length can also be summed up to get the total time an audience was exposed to the media. The media play log is filtered 665 and aggregated using a play log filtration module to get a Boolean graph of when the tested content was playing on the digital signage. Aggregation of the media play log is performed along the same unit of time as audience data.

These two data sets are then synchronized 237 in the audience data filtration 672 module so that they can be compared over time. An intersection of the audience available to the node and the media play log of contents is performed to find the audience that was available to the evaluated media contents on that node.

The data is aggregated over the entire duration of the predefined test time period to get the total audience available to the tested contents on that particular screen, using a content-level audience data aggregation module.

The data are compared along with the funnel model 679 to find out the performance level 238 of the contents. One exemplary comparison is to compare the audience measurement of a content to at least another content with regard to the layers in the funnel model. The comparison can be performed based on an application of predefined rules 983.

A content metrics generation module 239 calculates the results in the content evaluation metrics such as total viewing time achieved by the media content, or standard media metrics such as Gross Rating Points, Targeted Rating Points, etc.

Figure 12:
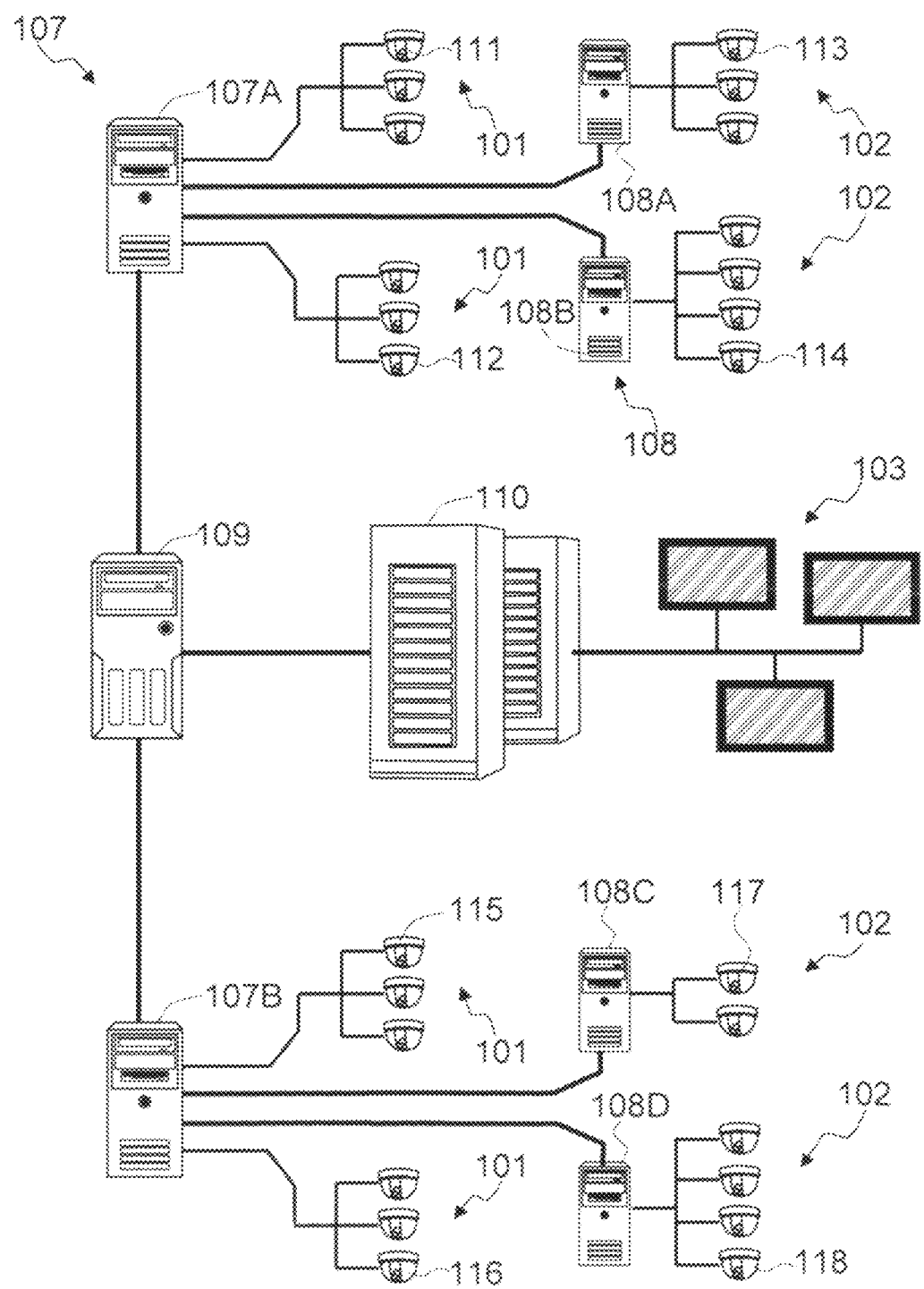
FIG. 12 shows an exemplary network of a plurality of means for control and processing, a plurality of means for capturing images, a plurality of means for storing data, and a plurality of means for playing contents in the present invention.

FIG. 12 shows an exemplary network of a plurality of means for control and processing, a plurality of means for capturing images that capture a plurality of video streams, a plurality of means for storing data, and a plurality of means for playing contents in the present invention.

In a simple and small scale application, a means for control and processing can process the entire images captured by one or multiple means for capturing images in order to measure the effectiveness of one or multiple contents from one or more means for playing contents, such as a digital signage.

For example, a means for control and processing can be connected to a first means for capturing images and a second means for capturing images that cover a digital signage in an area. In this case, the images from the first means for capturing images can be used to analyze the traffic of people and the images from the second means for capturing images can be used to analyze detailed behaviors or other types of attributes, such as emotion change or impression level, of the people with regard to the target contents.

However, for a large scale application, the embodiment can comprise a more complicated structure. In an exemplary embodiment shown in FIG. 12, the network comprises at least a first means for control and processing, e.g., 107A and 107B. The network can also comprise at least a second means for control and processing, e.g., 108A, 108B, 108C, and 108D.

The roles of the first means for control and processing and second means for control and processing are decided based on the network design plan. For example, a first means for control and processing 107A can be dedicated to a digital signage, and another first means for control and processing 107B can be dedicated to another digital signage in an area. A second means for control and processing, such as 108A and 108B, that are connected to the first means for control and processing 107A can process more detailed response measurement or other types of attributes, such as emotion change or impression level, of the people in regard to the digital signage that is covered by the first means for control and processing 107A.

A plurality of means for control and processing communicate with each other to synchronize the timestamped lists of measurements in a plurality of video streams, captured by the means for capturing images in the measured locations. The plurality of means for control and processing also communicate with a media server to get the play log information. The communications are synchronized.

In the exemplary embodiment, at least a means for capturing images, i.e., a first means for capturing images 101, is connected to the means for video interface in a first means for control and processing 107. Although a second means for capturing images 102 can be directly connected to the means for video interface in a first means for control and processing 107, in the exemplary embodiment shown in FIG. 12, at least a second means for capturing images 102 is connected to the means for video interface in a second means for control and processing 108.

In the exemplary embodiment shown in FIG. 12, a plurality of first means for capturing images 101, such as a "means for capturing images 1" 111 and a "means for capturing images 2" 112, are connected to the means for video interface in a first means for control and processing 107A that is different from the first means for control and processing 107B of another plurality of first means for capturing images 101, such as a "means for capturing images 5" 115 and a "means for capturing images 6" 116. The plurality of means for control and processing can be connected in a local area network and communicate with each other.

In an exemplary deployment of the system that embodies the present invention, the first means for capturing images 101 can be installed where the field-of-view can cover the traffic of the people in the measured location, and the second means for capturing images 102 can be installed near a location for the close view and detailed behavior analysis, emotion change detection, and impression-level detection of the people.

The digitized video data from the means for video interface is transferred to the means for control and processing that executes computer vision algorithms on the data. The means for control and processing can have internal or external means for storing data 110.

The means for storing data 110 can be used to host the content that are played by at least a means for playing content 103, i.e., digital signage, and other data, such as measurement, processed by the present invention. A media server keeps the play log of the played media contents and directs the media contents to the means for playing content 103.

The means for capturing images can comprise an analog camera, USB camera, or Firewire camera. The means for video interface, which can comprise a video frame grabber, USB interface, or Firewire interface, are typically included in the same enclosure as the means for control and processing. The means for control and processing can be a general purpose personal computer, such as a Pentium 4 PC, or a dedicated hardware that can carry out the required computation. The means for control and processing, as well as the means for video interface, can be placed locally or remotely, as long as the connection to the means for capturing images can be established. The internal means for storing data, such as an internal hard disk drive, is placed within the same enclosure as the means for control and processing. The external means for storing data, such as a network storage drive or internal hard disk drives contained in a remote data storage server, can be placed locally or remotely, as long as a means for transferring data is available.

The present invention can generate timestamped measurements in accordance with the behavior analysis, utilizing a time server 109. The exemplary time server 109 can maintain a synchronized time in the network of means for control and processing. In another exemplary embodiment, a first means for control and processing 107 can act as a server, and a plurality of second means for control and processing 108 can act as clients. The server can run its own local clock or be connected to a global time server 109 for the synchronization utilizing a time synchronization protocol, such as the Network Time Protocol (NTP). The timestamped measurements facilitate the synchronization among the played contents, the play log, and the timestamp values in the data structures used in the present invention.

The number of means for capturing images per a means for control and processing varies, depending on the system configuration in the physical space. However, each means for control and processing knows the location and the identification of each of its associated plurality of means for capturing images and the area covered by the means for capturing images.

While the above description contains much specificity, these should not be construed as limitations on the scope of the invention, but as exemplifications of the presently preferred embodiments thereof. Many other ramifications and variations are possible within the teachings of the invention. Thus, the scope of the invention should be determined by the appended claims and their legal equivalents, and not by the examples given.

What is claimed is:

1. A method for evaluating relative effectiveness of content in a digital signage network utilizing an audience measurement system that comprises a plurality of means for capturing images that are connected to at least a server through at least a means for video interface and automated video processing algorithms, comprising the following steps of:
   a) capturing a plurality of input images of people through the plurality of means for capturing images in the vicinity of at least a digital signage in said digital signage networks,
   b) processing said plurality of input images in order to measure behavior patterns of each person in said people, by applying computer vision algorithms to the input images as processes in the computer, in response to a plurality of contents played in the digital signage,
   c) tracking a plurality of persons in the vicinity of a digital signage and measuring a conversion rate from the traffic count that measures the number of people in the vicinity of the digital signage to the impression level that measures the actual number of people who viewed the content,
   d) gathering audience measurement data by aggregating the measurements for the behavior patterns of said people wherein the measurements comprise traffic count, impression levels, and emotion levels, and wherein impressions comprise leading, lagging, leading and lagging, and complete impressions, wherein emotional levels comprise positive or negative changes in emotion, wherein emotional levels are measured by an emotional change detection sub-module that measures the magnitude of the emotional change, wherein the emotional change is defined as a positive or negative change,
   e) comparing an average viewing length for a content and the play length of the content and measuring the completion percentage of viewing the content, wherein the average viewing length is calculated based on actual time the people spend watching the content through a viewership measurement by applying computer vision algorithms to the input images,
   f) extracting characteristic information from the audience measurement data and a media play log of the contents for the digital signage,
   g) measuring the response to the content based on different segments and trip type analysis of the people to execute content mix planning based on the measurement, wherein a trip type comprises trip patterns of the people in the vicinity of the digital signage, and wherein the trip type analysis is performed utilizing joined trajectories from tracking the people in the plurality of input images,
   h) evaluating the content in context,
   wherein the types of measurement are defined differently depending on the intended location of the digital signage,
   wherein contextual information includes spatiotemporal information, environmental information, and media consumption information about expected audience members,
   and whereby the context normalizes the data output and enhances analysis,
   i) using the audience measurement data to calculate a content effectiveness score through an exemplary formula, $S=\alpha*W+\beta*X+\gamma*Y+\delta*Z$, wherein W, X, Y, Z are the average number of lagging and leading, lagging, leading, and complete impressions respectively counted in a given time period, wherein $\alpha, \beta, \gamma, \delta$ are the coefficients assigned to W, X, Y, Z,
   j) comparing conversion rates in a funnel model of the people's engagement with products in response to the played contents,
   wherein the funnel model is defined as a model for interaction or engagement level of an audience with a content, product, or product category,
   wherein interaction and engagement levels of the audience comprise impression and emotion measurements and
   wherein the conversion rates between each engagement level in the funnel model are correlated with the effectiveness of the content in influencing the audience in each engagement level,
   k) creating an index as a metric index, wherein the index comprises an attraction index, an engagement index, an emotion change index related to emotion levels, a behavior index, or an average impression duration index related to average viewing length, and
   l) measuring the relative effectiveness of a content compared to at least another content in the plurality of contents at reaching a targeted audience and the effectiveness of conveying a message based on a comparison of said characteristic information in response to the played contents,
   wherein the relative effectiveness accounts for context for the display comprising intended location and audience,
   wherein the targeted audience comprises a set of people segmented based on parameters,
   wherein the set of people are segmented into the different segments based on parameters comprising demographics, location type, and time-of-day,
   m) calculating a set of content evaluation metrics via a content metrics generation module including the content effectiveness score, the conversion rate, the metric index, and the relative effectiveness of the content, and
   n) displaying the results of the set of content evaluation metrics via a video interface connected to a computer.

2. The method according to claim 1, wherein the method further comprises a step of comparing a set of contents by demographics and ranking the contents,
   wherein automated computer vision algorithms segments the demographics,
   wherein the contents are copy tested for different demographic groups, and
   wherein at least a high-performing content is selected for each targeted group based on the ranking.

3. The method according to claim 1, wherein the method further comprises a step of measuring emotion change of the people in response to the contents.

4. An apparatus for evaluating relative effectiveness of content in a digital signage network, comprising:
   a) a plurality of means for capturing images for capturing a plurality of input images of people in the vicinity of at least a digital signage in said digital signage networks, and
   b) at least a computer and computer vision algorithms that performs the following steps of:
   processing said plurality of input images in order to measure behavior patterns of each person in said people in response to a plurality of contents played in the digital signage,
   tracking a plurality of persons in the vicinity of a digital signage and measuring a conversion ratio from the traffic count that measures the number of people in the vicinity of the digital signage to the impression level that measures the actual number of people who viewed the content,
   gathering audience measurement data by aggregating the measurements for the behavior patterns of said people,
   wherein the measurements comprise traffic count, impression levels, and emotion levels, and
   wherein impressions comprise leading, lagging, leading and lagging, and complete impressions, extracting characteristic information from the audience measurement data and a media play log of the contents for the digital signage, wherein emotional levels comprise positive or negative changes in emotion, wherein emotional levels are measured by an emotional change detection sub-module that measures the magnitude of the emotional change, wherein the emotional change is defined as a positive or negative change,
   comparing an average viewing length for a content and the play length of the content and measuring the completion percentage of viewing the content,
   wherein the average viewing length is calculated based on actual time the people spend watching the content through a viewership measurement by applying computer vision algorithms to the input images,
   measuring the response to the content based on different segments and trip type analysis of the people to execute content mix planning based on the measurement,
   wherein a trip type comprises trip patterns of the people in the vicinity of the digital signage, and
   wherein the trip type analysis is performed utilizing joined trajectories from tracking the people in the plurality of input images,
   evaluating the content in context,
   wherein the types of measurement are defined differently depending on the intended location of the digital signage,
   wherein contextual information includes spatiotemporal information, environmental information, and media consumption information about expected audience members,
   and whereby the context normalizes the data output and enhances analysis,
   using the audience measurement data to calculate a content effectiveness score through an exemplary formula, $S=\alpha*W+\beta*X+\gamma*Y+\delta*Z$, wherein W, X, Y, Z are the average number of lagging and leading, lagging, leading, and complete impressions respectively counted in a given time period, wherein $\alpha, \beta, \gamma, \delta$ are the coefficients assigned to W, X, Y, Z, comparing conversion rates in a funnel model of the people's engagement with products in response to the played contents,
   wherein the funnel model is defined as a model for interaction or engagement level of an audience with a content, product, or product category,
   wherein interaction and engagement levels of the audience comprise impression and emotion measurements and
   wherein the conversion rates between each engagement level in the funnel model are correlated with the effectiveness of the content in influencing the audience in each engagement level,
   creating an index as a metric index, wherein the index comprises an attraction index, an engagement index, an emotion change index related to emotion levels, a behavior index, or an average impression duration index related to average viewing length, and
   measuring the relative effectiveness of a content compared to at least another content in the plurality of contents at reaching a targeted audience and the effectiveness of conveying a message based on a comparison of said characteristic information in response to the played contents,
   wherein the relative effectiveness accounts for context for the display comprising intended location and audience,
   wherein the targeted audience comprises a set of people segmented based on parameters,
   wherein the set of people are segmented into the different segments based on parameters comprising demographics, location type, and time-of-day,
   calculating a set of content evaluation metrics via a content metrics generation module including the content effectiveness score, the conversion rate, the metric index, and the relative effectiveness of the content, and
   displaying the results of the set of content evaluation metrics via a video interface connected to a computer.

5. The apparatus according to claim 4, wherein the apparatus further comprises a computer for comparing a set of contents by demographics and ranking the contents,
   wherein automated computer vision algorithms segments the demographics,
   wherein the contents are copy tested for different demographic groups, and
   wherein at least a high-performing content is selected for each targeted group based on the ranking.

6. The apparatus according to claim 4, wherein the apparatus further comprises a computer for measuring emotion change of the people in response to the contents.

\* \* \* \* \*